Patented June 23, 1953

2,643,260

UNITED STATES PATENT OFFICE 2,643,260

WINTERIZED VEGETABLE OIL AND PROCESS OF PRODUCING THE SAME

Arnold L. Ayers and Cleveland R. Scott, Bartlesville, Okla., assignors to Phillips Petroleum Company, a corporation of Delaware No Drawing. Original application November 25, 1949, Serial No. 129,494, now Patent No. 2,607,695, dated August 19, 1952. Divided and this application April 16, 1952, Serial No. 291,992

8 Claims. (Cl. 260—398.5)

The present invention relates to the treatment of vegetable oils, for example cottonseed oil, linseed oil, corn oil, olive oil and the like. In one of its aspects the invention relates to the addition of certain stabilizers to vegetable oils which, as known, have a tendency to solidify or to throw out solid materials when kept at lower temperatures as when under refrigeration.

The invention is a division of our copending application Serial No. 129,494, filed November 25, 1949, now Patent No. 2,607,695.

As stated, it is known that when a vegetable oil such as cottonseed oil is kept at refrigerator temperatures, stearin crystallization in the oil will occur making its appearance objectionable. Also, cottonseed oil containing an appreciable proportion of stearin is not satisfactory for use in the preparation of emulsions, for example, mayonnaise, because at refrigerator temperatures the stearin crystals seed out and cause breaking of the emulsion and concomitant oil separation.

The conventional winterization of vegetable oils, such as cottonseed oil, is effected by maintaining the oil at a low temperature and for a time sufficient to crystallize therefrom the components thereof which are crystallizable under ordinary storage conditions. Thus, it is common practice to seed cottonseed oil long enough and at a sufficiently low temperature to produce an oil fraction which will withstand a temperature of about 32° F. for about ten hours. For the better products which are used in preparing commercial emulsions, requiring handling and shipping in winter weather when extremely low temperatures prevail for days, the cold test is fifteen to twenty hours and in the case of some oils even a longer period. Following the cold treatment, the oil is filtered and deodorized to prepare a salad oil.

It is evident from the foregoing that the winterization of vegetable oils, as described, is an expensive space, equipment, and time consuming operation.

Thus, to avoid the expense attendant upon winterization, the so-called hard constituents of vegetable oils, that is, the components which crystallize out, on standing at low temperatures, such as stearin and palmitin, have been allowed to at least in part remain in the oils and certain additives or stabilizers have been admixed therewith to prevent the crystallization of the said hard constituents at low temperatures for substantial lengths of time.

It is among the objects of this invention to provide novel additives or stabilizers to prevent the crystallization of hard constituents from vegetable oils upon standing at low temperatures. It is also among the objects of the invention to provide novel compositions of vegetable oils and certain additives, which compositions are stable against said crystallization of hard constituents upon standing for long periods of time at low temperatures.

Other objects and advantages are apparent from this specification and the appended claims.

According to this invention there is added to a vegetable oil a stabilizing agent selected from the group of oily substances consisting of coconut oil, petrolatum, linoleic acid dimer, which may contain some oleic acid, lanolin, lactic acid and a Cellosolve ester e. g. glycol monoethyl ether acetate. The addition of the stabilizer can be accomplished either before or after the usual winterizing process when it is to be employed. When effected, winterization can be made less severe with a concomitant savings of expense if the additives of the invention are used. It is to be noted that when winterizing is made less severe, or dispensed with altogether, there is a corresponding increase in the yield of stable oil. Cellosolve esters are toxic materials and their use is confined to the preparation of products which will not be used for food purposes.

The addition of the stabilizers of this invention can be accomplished readily, mere admixture being sufficient to prepare a homogeneous product. Usually about 0.1% to about 10%, preferably about 1% to about 3%, of stabilizer, by weight of the oil to be stabilized, will be used.

The following examples illustrate the invention. In the table, to be noted are the comparisons with the untreated or control cottonseed oil and with the oil to which lecithin has been added as a stabilizer, lecithin being known for this purpose.

EXAMPLE I

*Stabilizing of cottonseed oil*

Samples were prepared by adding 2 per cent by weight of each test material to refined, unwinterized cottonseed oil. Each sample was sealed in a 3 ounce bottle and immersed into a constant temperature bath at 5° C. A sample of refined, unwinterized cottonseed oil and a sample containing lecithin were used as control standards. Observations and comparisons with the standard samples were made hourly. When a sample became completely solid, it was removed from the bath and observations were no longer recorded.

The table is a record of the hourly observations of the various materials tested. The following terms were used to indicate the appearance of the samples from clear to completely solid:

Clear—transparent and unchanged from the original appearance.
Haze—opaque or slightly cloudy, but completely fluid and only a slight increase in apparent viscosity.
Cloudy—includes any stage of solidification from haze to semi-solid. Generally very viscous.
Semi-solid—indicates that part of the sample has been completely solidified leaving only part of the sample in a fluid state.
Solid—indicates that the sample has completely solidified.

TABLE

| | Coconut Oil | Petrolatum | Dimer C-90,[2] Armour | Lanolin | Control, Cottonseed Oil | Lecithin, Gliddol R |
|---|---|---|---|---|---|---|
| Obs. 1 hr. at 5 C | Clear | Cloudy | Clear | Cloudy | Haze | Haze. |
| Obs. 2 hrs. at 5 C | Haze | do | do | do | do | Do. |
| Obs. 3 hrs. at 5 C | do | do | Slight Haze | do | Cloudy | Cloudy. |
| Obs. 4 hrs. at 5 C | Cloudy | do | Haze | do | Solid [1] | Do. |
| Obs. 5 hrs. at 5 C | do | do | Cloudy | do | | Do. |
| Obs. 6 hrs. at 5 C | do | do | do | do | | Do. |
| Obs. 7 hrs. at 5 C | Semi-Solid | Semi-Solid | Solid [1] | Solid [1] | | Solid.[1] |
| Obs. 70 hrs. at 5 C | Semi-Solid [1] | Solid [1] | | | | |

[1] At this point the sample was removed from the bath.
[2] Linoleic acid dimer with some oleic acid present.

From the table it is clear that any one of the stabilizers of the invention yields results as good as lecithin and that at least the coconut oil and the dimer C-90 will yield a clear product upon admixture. Also noted is the fact that the coconut oil and petrolatum treated oils, in the test reported, had reached only the semi-solid stage when lecithin treated oil was solid. Even at the 70 hour stage the coconut oil treated sample was but semi-solid indicating that under ordinary cold conditions coconut oil is an ideal winterizing or stabilizing agent.

EXAMPLE II

*Stabilizing of cottonseed oil*

Thirty gms cottonseed oil containing 2 per cent lactic acid was maintained at 0° C. for 48 hours. It remained fluid and there was no apparent change.

EXAMPLE III

*Stabilizing of cottonseed oil using ethylene glycol monoethyl ether acetate*

| Temperature, °C. | Time, Hrs. | Amount Additive (Percent) | Effect |
|---|---|---|---|
| 5 | 4 | None | Solid. |
| 5 | 4 | 2 | No Change. |
| 5 | 75 | 2 | Very Cloudy but still fluid. |

EXAMPLE IV

*Stabilizing of peanut oil*

| Temperature, °C. | Time, Hrs. | Additive Used | Amount Additive (Percent) | Effect |
|---|---|---|---|---|
| 10 | 21 | None | None | Solid. |
| 10 | 21 | Lanolin | 2 | No apparent change. |
| 10 | 72 | do | 2 | Semisolid. |
| 10 | 12 | None | None | Solid. |
| 10 | 12 | Petrolatum | 2 | Semisolid. |
| 10 | 22 | do | 2 | Barely Solid. |

Reasonable variation and modification are possible within the scope of the above disclosure and the appended claims to the invention, the essence of which is that certain substances, as set forth, have been discovered to be very satisfactory stabilizing agents for vegetable oils.

We claim:
1. The process of winterizing a vegetable oil which comprises the step of adding to the oil linoleic acid dimer as a stabilizer.
2. The process of winterizing cottonseed oil which comprises the step of adding to the oil linoleic acid dimer as a stabilizer.
3. A vegetable oil containing linoleic acid dimer as a stabilizer.
4. Cottonseed oil containing linoleic acid dimer as a stabilizer.
5. A vegetable oil containing from 0.1 to 10 per cent of linoleic acid dimer as a stabilizer.
6. Cottonseed oil containing from 0.1 to 10 per cent of linoleic acid dimer as a stabilizer.
7. A vegetable oil containing from 1 to 3 per cent of linoleic acid dimer as a stabilizer.
8. Cottonseed oil containing from 1 to 3 per cent of linoleic acid dimer as a stabilizer.

ARNOLD L. AYERS.
CLEVELAND R. SCOTT.

No references cited.